Sept. 1, 1964   W. STELZER   3,147,042
VEHICLE BRAKE MECHANISM
Filed Feb. 5, 1962
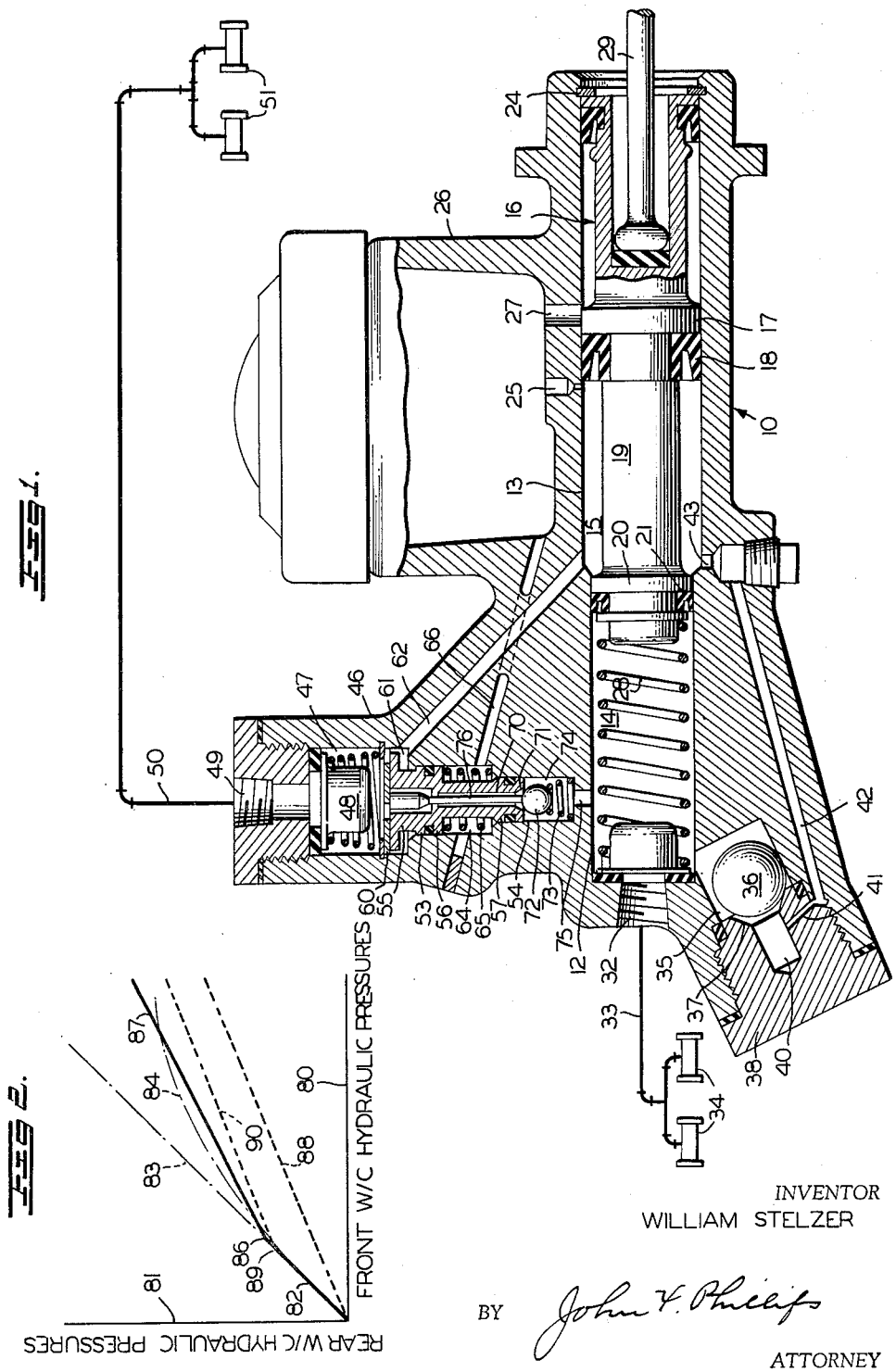
INVENTOR
WILLIAM STELZER
BY John F. Phillips
ATTORNEY

United States Patent Office 3,147,042
Patented Sept. 1, 1964

3,147,042
VEHICLE BRAKE MECHANISM
William Stelzer, Bloomfield Hills, Mich., assignor to Kelsey-Hayes Company, Romulus, Mich., a corporation of Delaware
Filed Feb. 5, 1962, Ser. No. 171,064
14 Claims. (Cl. 303—6)

This invention relates to a vehicle brake mechanism, and has special reference to a correcting valve for a weight transfer brake proportioning master cylinder.

It has been proposed to provide vehicle master cylinders so constructed that after a given rate of vehicle deceleration has been reached, after initial operation of the brakes, the supply of pressure fluid to one set of vehicle wheel cylinders, for example the rear wheel cylinders of a passenger vehicle, is reduced, while at the same time the pressure is increased in the other wheel cylinders, which would be the front wheel cylinders of a passenger vehicle. It is possible under certain conditions that the operation of such mechanism will fail to produce the greatest possible braking efficiency if pressure in the rear wheel cylinders is too low.

An important object of the present invention is to control the distribution of braking fluid under pressure to the front and rear wheel cylinders according to the rate of vehicle deceleration of the vehicle to compensate for vehicle body weight transfer occurring by such deceleration, such control being accomplished by increasing the pressure in the front wheel cylinders and decreasing it in the rear wheel cylinders in the same ratio as the vehicle body weight is shifted toward the front of the vehicle.

A further object is to provide a brake operating mechanism of the character referred to having novel means for assuring the proper distribution of brake fluid pressures if, for any reason, the fluid pressure to the rear wheel cylinders tends to be too low.

A further object is to provide in a mechanism of this character a master cylinder having relatively large capacity and small capacity chambers connected respectively, in the case of a passenger vehicle, to the front wheel cylinders and to the rear wheel cylinders, and to provide for control means in association therewith whereby fluid from the relatively large chamber will be supplied to the rear wheel cylinders in addition to that supplied from the relatively small chamber until the rate of vehicle deceleration reaches a pre-determined point, and then to cut off the supply of fluid from the relatively large chamber to the rear wheel cylinders and to assure the maintenance in the rear wheel cylinders of adequate brake operating pressure.

A further object is to provide such a master cylinder and associated elements wherein means is provided, in the event pressure is not sufficiently built up in the rear wheel cylinders, to render the device effective for supplying additional fluid to the rear wheel cylinders to maintain proper pressures therein.

A further object is to provide means responsive to pressures in the relatively large chamber referred to and in the rear wheel cylinders for cutting off communications between the relatively large chamber and the rear wheel cylinders when the pressure in the latter increases to a pre-determined point, and to reopen such communication if pressure in the rear wheel cylinders drops below a pre-determined point, thus assuring the maintenance in the rear wheel cylinders under vehicle deceleration conditions, of the proper pressure which will be lower than the pressure supplied to the front wheel cylinders.

Other objects and advantages in the invention will become apparent during the course of the following description.

In the drawing I have shown one embodiment of the invention. In this showing

FIGURE 1 is a sectional view through the master cylinder of the present invention and associated elements, parts being shown in elevation and the wheel cylinders and associated fluid connections being diagrammatically shown, and FIGURE 2 is a graph illustrating the distribution of braking forces under different conditions.

Referring to FIGURE 1, the numeral 10 designates a master cylinder as a whole having in one end a bore 12 and in its other end a larger bore 13 respectively forming chambers 14 and 15. A plunger indicated as a whole by the numeral 16 has a head 17, provided with a seal 18, slidable in the bore 13. A shank 19 connects the head 17 with a second smaller head 20 sealed as at 21, and slidable in the bore 12.

Movement of the plunger 16 to off position is limited by a snap ring 24, and in such normal position, the chamber 15 communicates through a replenishing port 25 with a reservoir 26, provided with a second port 27 conventionally communicating with a space behind the head 17. The plunger 16 is biased to its normal off position by a spring 28. The plunger 16 is conventionally operated by a push rod 29 connected to the usual brake pedal (not shown).

The forward end of the chamber 14 communicates through a port 32 with a fluid line 33 connected to one set of vehicle wheel cylinders 34, for example the wheel cylinders of the front wheels of the vehicle. It will be apparent that movement of the head 20 displaces fluid from the chamber 14 to the wheel cylinders 34, and fluid is also displaced, at a slower rate for a reason given below, from the chamber 14 into a chamber 35 in which is arranged a ball valve 36 engageable with a seat 37 carried by the inner end of a plug 38. The bottom of the seat 37 slopes downwardly and rearwardly from the horizontal to tend to maintain the ball 36 unseated. The valve seat 37 communicates with a small chamber 40 from which fluid flows through a restricted passage 41, in the plug 38, into a passage 42 in the body of the master cylinder. This passage communicates at its rear end with the chamber 15 through a port 43 back of the head 20.

The body of the master cylinder is provided with a preferably integral extension 46 having a chamber 47 therein communicating through a conventional residual pressure valve 48 with a port 49. This port communicates with one end of a fluid line 50 leading to the rear wheel brake cylinders 51.

Below the chamber 47, the extension 46 is provided with two bores 53 and 54 of different diameters. A piston 55 has an upper plunger portion 56 slidable in the bore 53 and a lower plunger portion 57 slidable in the bore 54. The upper end of the piston 55 is limited in its upward movement by an apertured plate 60. Beneath the plate 60 is a chamber 61 communicating with one end of a passage 62, the other end of which communicates with the chamber 15.

The space beneath the plunger portion 56 forms a chamber 64 in which is arranged a spring 65 biasing the piston 55 upwardly. The chamber 64 is maintained at atmospheric pressure and for this purpose, a passage 66 may be connected between the chamber 64 and the reservoir 26.

The piston 55 is provided with an axial passage 70 therethrough terminating at its lower end in a valve seat 71 engageable by a ball valve 72 biased upwardly by a spring 73 arranged in a chamber 74 formed by the lower end of the bore 54. This chamber communicates through a port 75 with the chamber 14. A trip rod 76 is arranged in the axial passage 70. When the piston 55 is in the normal position shown, this rod, engaging the plate 60, maintains the ball valve 72 off its seat in which case the chamber 14 communicates with the wheel cylinders 51 as will become more apparent below.

In FIGURE 2 I have graphically illustrated front and rear brake cylinder pressures occurring under different operating and theoretical conditions. The ordinate line 80 indicates front wheel cylinder hydraulic pressures, while the abscissa 81 indicates rear wheel brake hydraulic pressures. In the operation of the present mechanism, up to points referred to below, front and rear wheel brake cylinder pressures increase as indicated by the line 82, and in the absence of the present device, such line would continue relatively straight as at 83. Under ideal brake control conditions, braking pressures would generally follow the broken line 84, the rate of increase in pressure beyond a given point being much greater in the front wheel cylinders than in the rear wheel cylinders.

In the present system, due to the arrangement of parts, front and rear wheel cylinder pressures progress conventionally up to approximately the point 86, at which point the ball valve 36 closes, and then pressures angle off as at 87 reasonably closely approximating the theoretically ideal line 84. In the absence of the spring 65 of the present mechanism, starting from the zero point, braking pressures would generally follow the dotted line 88. With the present mechanism, the ball valve 72 closes at approximately the point 89, and if the ball valves 36 and 72 close too soon, the graphic pressure line may follow the dotted line 90. In such case, the present mechanism functions to raise pressures in the rear wheel cylinders 51, thus providing the maximum total braking effect without the locking and sliding of the rear vehicle wheels.

*Operation*

The parts are all shown in their normal positions in FIGURE 1, the plunger 16 being fully retracted and the valves 36 and 72 being open. To apply the brakes, the operator will depress the brake pedal to move the plunger 16 toward the left. Fluid will be displaced from the chamber 14 through the conventional residual valve and through lines 33 to the front wheel brake cylinders 34. Fluid will be displaced from the chamber 15 through passage 62 into chamber 61, thence through the apertured plate 60 and into the lines 50 leading to the rear wheel brakes 51. The volume of brake fluid displaced from the chamber 15 will be very small, such volume being proportional to the annular area defined by the difference between the diameters of the bores 12 and 13. However, with the ball valve 72 open, some of the fluid displaced from the chamber 14 will flow past the ball 72 through the axial passage 70 and thence upwardly into the fluid line 50. Thus the full volumetric requirements of both sets of wheel cylinders will be met for setting all of the brake shoes.

The chamber 64 is under atmospheric pressure, as stated. Accordingly when pressure is built up to a pre-determined point in the chamber 47, a net downward pressure affecting the plunger 55 will move this plunger downwardly, thus engaging the seat 71 with the ball 72. The spring 65 is so dimensioned that it yields when a certain hydraulic pressure is reached in the chamber 47, and this pressure must be less than the hydraulic pressure which may exist when the ball 36 closes, as described below. It will become apparent that the downward movement of the plunger 55 closes the valve 72 approximately at the point 89 in FIGURE 2 whereas the ball 36 closes approximately at the point 86.

After the ball 72 closes, fluid can be supplied from the chamber 14 to the rear wheel cylinders only past the valve 36, and this flow is substantially restricted by the passage 41. Since the rear brake shoes at this point are set, it is only a matter of increasing pressure in the rear wheel cylinders and very little fluid is required for this purpose. The flow of fluid from the chamber 14 takes place through the restricted passage 41, passage 42 and port 43 into the chamber 15 from which the additional fluid, together with the fluid from the chamber 15, will be displaced through the passage 62 and into the rear wheel cylinders as described above.

When a pre-determined rate of vehicle deceleration is reached, the ball 36 ascends the bottom slope of the valve seat 37, thus closing communication between the chamber 14 and the rear wheel cylinders through the passage 42.

As previously stated, the ball 36 closes at the point 86 (FIGURE 2), after the closing of the ball 72. From this point on hydraulic pressures are supplied respectively to the front and rear wheel cylinders solely from the chambers 14 and 15 and pressures in the wheel cylinders are modified according to the fixed volume transmitted from these chambers.

Pressures in the rear wheel cylinders rise less rapidly than in the front wheel cylinders as the brake pedal is further depressed, to furnish as nearly as possible the ideal distribution of brake load according to changing requirements throughout the range of brake application. Thus in normal operation, the vehicle can be subjected to maximum braking forces which can be tolerated without the locking and sliding of the rear wheels. During such continued brake operation, obviously pressure maintains the plunger 55 depressed and the ball 72 remains closed. During rapid deceleration of course the ball 36 also remains closed.

Should the ball 36 by accident have closed too soon, not enough pressure would be built up in the rear wheel cylinders and therefore the rear brakes would not perform their share of the work. Under such conditions the ratio of front to rear wheel cylinder pressures would be greatly increased. In such case the high pressure transmitted to the chamber 74 from the chamber 14 would overcome pressure acting downwardly on the plunger 55 until a balance is reached between the combined forces of pressure in the chamber 74 and the spring 65 on the one hand, and pressure in the chamber 47 on the other. Thus the valve 72 would be cracked and additional pressure would be supplied to the rear wheel cylinders through the passage 70. This additional pressure would be sufficient to produce effective braking at the rear wheels. As such pressure increases, downward forces acting on the plunger 55, at the proper point, would close the valve 72.

The valve mechanism above the chamber 14 serves to provide a bypass of fluid to the rear wheel cylinders in the initial stage of brake operation for a quick setting of the rear wheel brakes. Such mechanism also serves to correct the undesirable situation which could occur if the ball 36 accidentally closes before the desired pre-determined rate of vehicle deceleration is reached at which such ball is intended to close. Referring to FIGURE 2 it will be noted that in the absence of the present device, that is with a conventional brake mechanism, brake pressures to the front and rear wheel cylinders would continue from the initial point of brake pedal operation as indicated by the lines 82 and 83. However, with the present mechanism, braking proceeds conventionally as indicated by the line 82 up to the point 86. At the point 89, the valve 72 closes, as previously stated, and rear wheel brake pressures will continue to increase up to the point 86 where the valve 36 closes. Beyond this point, in normal operation, the only fluid supplied to the rear wheel cylinders will come from the chamber 15 and the rate of increase in pressure in the rear wheel cylinders will be retarded as indicated by the line 87, while front wheel pressures will increase in accordance with pressure generated in the chamber 14 either by direct operation of the brake pedal or by a power or booster motor connected to the rod 29.

Obviously without the spring 65 to assist in opposing downwardly movement of the plunger 55, the rate of increase in pressures at the rear wheel cylinders would be too low, and braking pressures would increase as indicated by the line 88. The force of the spring 65 added to pressures acting against the bottom of the plunger 55 tends to maintain pressure increases beyond the point 86 as indicated at 87, and this line closely approximates ideal conditions graphically represented by the line 84. If the ball 36 should close too soon to cut off any supply of fluid from the chamber 14 to the chamber 15, the braking pressures might increase as indicated by the line 90. It is under such conditions however that higher pressures transmitted to the chamber 74 from the chamber 14 will move the plunger 55 upwardly to supply additional fluid under pressure from the chamber 14 past the valve 72 and into the rear wheel cylinders. The present mechanism therefore provides automatically for the subjection of the rear wheel cylinders to properly increasing pressures to provide for substantially ideal braking conditions without the locking and sliding of the rear wheels and with insurance against lower pressures than desired in the rear wheel cylinders which could occur incident to the early closing of the ball valve 36.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A braking system for a motor vehicle having a set of front wheel cylinders and a set of rear wheel cylinders, a fluid pressure generating device having a relatively large pressure chamber permanently in communication with said front wheel cylinders and a relatively small pressure chamber permanently in communication with said rear wheel cylinders, said pressure chambers having plunger means for displacing a relatively large volume of fluid to said front wheel cylinders and a relatively smaller volume of fluid to said rear wheel cylinders, a by-pass normally connecting said chambers whereby, upon operation of said plunger means, both of said chambers supply fluid to either of said sets of wheel cylinders, valve means interposed in said by-pass to close said by-pass, and means responsive to fluid pressure in said by-pass to close said valve means when a predetermined pressure is reached to thereby proportion the additional pressure output from said chambers to the respective wheel cylinders through said permanent communication according to the relative displacement of said chambers.

2. A braking system according to claim 1 provided with means for reopening said by-pass when pressure in said relatively large chamber exceeds a pre-determined point relative to pressure in said rear wheel cylinders.

3. A braking system for a motor vehicle having different sets of wheel cylinders, a fluid pressure generating device having a relatively large pressure chamber and a relatively small pressure chamber and plunger means for generating pressures in such chambers, a fluid line connecting said relatively large chamber to one set of wheel cylinders, a second fluid line connecting said relatively small chamber to the other set of wheel cylinders, a first by-pass normally connecting said chambers whereby, upon operation of said plunger means, both of said chambers supply fluid to said second fluid line, pressure responsive means controlling said first by-pass and subject to pressures in said large chamber and in said second line and operative for closing said first by-pass to said large chamber when pressure in said second line reaches a pre-determined point relative to pressure in said large chamber, a second by-pass for supplying fluid at a restricted rate of flow from said large chamber to said second line, and means responsive to a pre-determined rate of vehicle deceleration for closing said second by-pass.

4. A braking system according to claim 3 provided with means for reopening said first by-pass when pressure in said relatively large chamber exceeds a pre-determined point relative to pressure in said second fluid line.

5. A braking system for a motor vehicle having different sets of wheel cylinders, a fluid pressure generating device having a relatively large pressure chamber and a relatively small pressure chamber and plunger means for generating pressures in such chambers, a fluid line connecting said relatively large chamber to one set of wheel cylinders, a second fluid line connecting said relatively small chamber to the other set of wheel cylinders, a by-pass normally connecting said chambers whereby, upon operation of said plunger means, both of said chambers supply fluid to said second fluid line, pressure responsive means controlling said by-pass and subject to pressures in said large chamber and in said second line and operative for closing said by-pass to said large chamber when pressure in said second line reaches a pre-determined point relative to pressure in said large chamber, a by-pass chamber communicating with said large chamber, a duct normally affording restricted communication between said by-pass chamber and said relatively small chamber, and an inertia valve in said by-pass chamber operable upon a pre-determined rate of vehicle deceleration for closing said duct.

6. A braking system according to claim 5 provided with means for reopening said by-pass when pressure in said relatively large chamber exceeds a pre-determined point relative to pressure in said second fluid line.

7. A braking system for a motor vehicle having a set of front wheel cylinders and a set of rear wheel cylinders, a fluid pressure generating device having a relatively large pressure chamber permanently in communication with said front wheel cylinders and a relatively small pressure chamber permanently in communication with said rear wheel cylinders, said pressure chambers having plunger means for displacing a relatively large volume of fluid to said front wheel cylinders and a relatively smaller volume of fluid to said rear wheel cylinders, a by-pass normally connecting said chambers whereby, upon operation of said plunger means, both of said chambers supply fluid to either of said sets of wheel cylinders, valve means interposed in said by-pass to close said by-pass, a pressure responsive device having differential pressure areas subject respectively to pressures in said large chamber and in said rear wheel cylinders and provided with a passage therethrough forming a part of said by-pass, and a normally open valve between said passage and said large chamber and engageable by said pressure responsive device to close said passage upon movement of such device incident to the building up of a predetermined pressure in said rear wheel cylinders relative to pressure in said large chamber.

8. A braking system according to claim 7 provided with a second by-pass normally providing for the restricted flow of fluid from said relatively large chamber to said rear wheel cylinders, and means operative upon a predetermined rate of vehicle deceleration for closing said second by-pass.

9. A braking system according to claim 7 provided with a second by-pass normally providing for the restricted flow of fluid from said relatively large chamber to said rear wheel cylinder, and an inertia responsive valve operative upon a pre-determined rate of vehicle deceleration for closing said second by-pass, said pressure responsive device having a spring biasing it to a position in which said normally open valve is open, said spring being overcome to close said normally open valve initialy prior to the closing of said inertia responsive valve.

10. A braking system for a motor vehicle having different sets of wheel cylinders, a fluid pressure generating device comprising a body having relatively larger and smaller connected bores, connected plunger heads slidable in said bores, a fluid line connecting said smaller bore to one set of wheel cylinders, said body having a control chamber and a passage connecting such chamber to said larger bore, said control chamber being connected to the other set of wheel cylinders, said body having cylinders of different diameters the larger of which communicates with said control chamber and the smaller of which communicates with said smaller bore, a piston biased toward said control chamber and having portions slidable in said cylinders to be moved toward said smaller bore when pressure in said control chamber reaches a pre-determined point relative to pressure in said smaller bore, said piston having a passage therethrough normally connecting said smaller bore with said control chamber, and a normally open valve between said piston and said smaller bore, movement of said piston engaging it with said valve to close said piston passage, said piston passage cooperating with said body passage to form a by-pass whereby, upon operation of said plunger heads, fluid will be displaced from both of said bores into said other set of wheel cylinders until said piston moves to close said valve.

11. A braking system according to claim 10 provided with a duct normally providing for the restricted flow of fluid from said smaller bore to said other set of wheel cylinders, and means for closing said duct when the rate of vehicle deceleration increases above a pre-determined point.

12. A braking system according to claim 10 provided with a duct normally providing for the restricted flow of fluid from said smaller bore to said other set of wheel cylinders, and means for closing said duct when the rate of vehicle deceleration increases above a pre-determined point, said piston being biased toward said control chamber by a spring which tends to yield to pressure in said control chamber to move said piston and close said valve prior to the closing of said duct.

13. A braking system according to claim 10 provided with a by-pass chamber communicating with said smaller bore, a by-pass duct normally providing for the restricted flow of fluid from said by-pass chamber to said larger bore, and inertia responsive means in said by-pass chamber for closing said duct when the rate of vehicle deceleration increases to a pre-determined point.

14. A braking system according to claim 10 provided with a by-pass chamber communicating with said smaller bore, a by-pass duct normally providing for the restricted flow of fluid from said by-pass chamber to said larger bore, inertia responsive means in said by-pass chamber for closing said duct when the rate of vehicle deceleration increases to a pre-determined point, and a spring biasing said piston to a normal position in which said valve is open, said spring being so dimensioned as to yield for the closing of said valve before said pre-determined rate of vehicle deceleration is reached.

References Cited in the file of this patent

FOREIGN PATENTS

| | | |
|---|---|---|
| 51,128 | France | Apr. 29, 1941 |
| | (2nd addition of 833,592) | |
| 1,072,117 | Germany | Dec. 24, 1959 |